United States Patent
Ougi et al.

(10) Patent No.: US 6,928,110 B2
(45) Date of Patent: Aug. 9, 2005

(54) ADAPTIVE EQUALIZER TRAINING CIRCUIT, MODEM APPARATUS AND COMMUNICATION APPARATUS

(75) Inventors: Toshiyuki Ougi, Tokyo (JP); Mikio Mizutani, Tokyo (JP); Nobuhiko Noma, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 667 days.

(21) Appl. No.: 09/861,709

(22) Filed: May 22, 2001

(65) Prior Publication Data

US 2001/0048717 A1 Dec. 6, 2001

(30) Foreign Application Priority Data

May 24, 2000 (JP) ........................................ 2000-153771

(51) Int. Cl.[7] .............................................. H03H 7/40
(52) U.S. Cl. ................... 375/231; 375/323; 375/350; 370/278; 370/290; 370/292; 708/315; 708/323; 455/307
(58) Field of Search ................................. 375/219, 220, 375/232, 229, 231, 236, 316, 368, 450; 370/278, 280, 281, 292, 291, 319, 343, 402, 465, 480; 708/405, 315, 322, 323; 455/296, 307

(56) References Cited

U.S. PATENT DOCUMENTS

| | | | |
|---|---|---|---|
| 5,285,474 A | | 2/1994 | Chow et al. |
| 5,461,640 A | * | 10/1995 | Gatherer ..................... 375/231 |
| 6,259,729 B1 | | 7/2001 | Seki |
| 6,456,654 B1 | * | 9/2002 | Ginesi et al. ............... 375/229 |
| 6,674,795 B1 | * | 1/2004 | Liu et al. .................... 375/231 |

FOREIGN PATENT DOCUMENTS

| | | |
|---|---|---|
| EP | 0963068 | 12/1999 |
| EP | 1081905 | 3/2001 |
| JP | 11-186942 | 7/1999 |

OTHER PUBLICATIONS

X.F. Wang et al., 1999 IEEE Pacific Rim Conference on Communications, Computers and Signal Processing, vol. CONF. 7, Aug. 22–24, 1999, pp. 572–575.

J.S. Chow et al., Proceedings of the International Conference on Communications, vol. 2, May 23–26, 1993, pp. 761–765.

* cited by examiner

*Primary Examiner*—Dac V. Ha
(74) *Attorney, Agent, or Firm*—Greenblum & Bernstein, P.L.C.

(57) ABSTRACT

A training circuit for training a tap coefficient of an adaptive equalizer that performs error calculations in a training process and updating of the tap coefficient in a time area and thereby makes the tap coefficient converge stably in a short time.

12 Claims, 11 Drawing Sheets

ADAPTIVE EQUALIZER TRAINING CIRCUIT, MODEM APPARATUS AND COMMUNICATION APPARATUS

BACKGROUND OF THE INVENTION

1. Field of the Invention

The present invention relates to an adaptive equalizer applicable to a modem that carries out communication according to a frequency multiplexing system and a communication apparatus using the adaptive equalizer.

2. Description of the Related Art

As a technology for implementing high-speed data communication using a metallic cable, an ADSL (Asymmetric Digital Subscriber Line) is being developed. In an ADSL apparatus, transmission data is assigned to a plurality of frequencies, a few bits each, subjected to IFFT (inverse fast Fourier transform) and sent out to a transmission path. In the explanations hereafter, this system will be referred to as a "frequency multiplexing system". The transmission data is divided into units of IFFT processing as one symbol, and a signal with a guard band to guard against interference between symbols added is sent out as one symbol. For example, in the case of G. Lite, which is one of the ADSL standards, 16 samples of guard band are added to 256 samples of data over the forward link. In the actual line, interference between symbols is expected to be longer than a guard band, and therefore the receiver is provided with an adaptive equalizer to reduce interference between symbols. The Unexamined Japanese Patent Publication NO.HEI 7-516790 discloses an adaptive equalizer training circuit that adapts a tap coefficient of an FIR type filter used as an adaptive equalizer quickly and stably.

Figure 1:
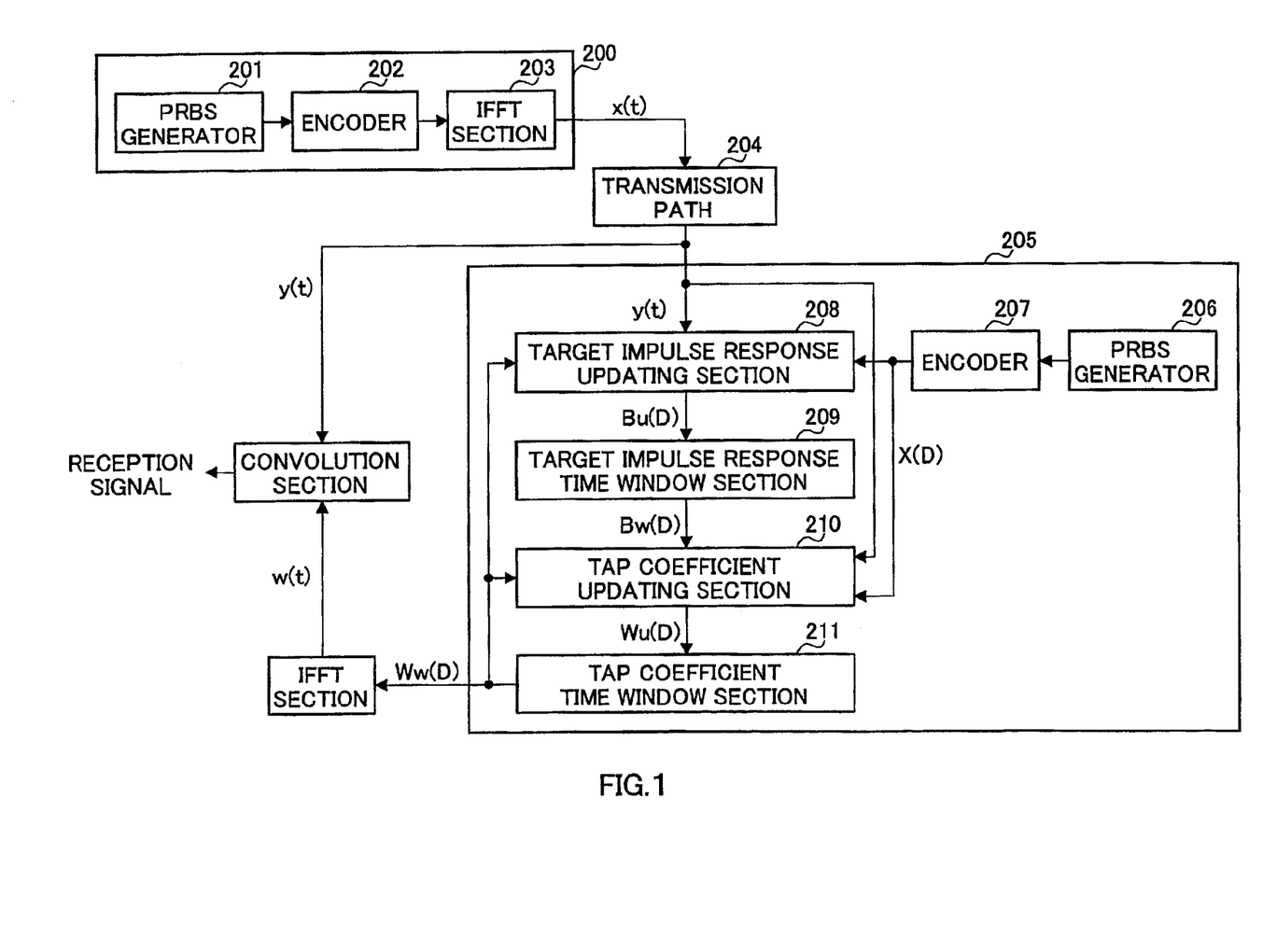
FIG. 1 is a block diagram of a conventional adaptive equalizer training circuit.

FIG. 1 is a functional block diagram of such an adaptive equalizer training circuit. During training of the adaptive equalizer, in transmitter 200, PRBS generator 201 generates a PRBS (pseudo-random sequence) signal, encoder 202 encodes the PRBS signal and generates frequency area signal X (D), IFFT section 203 converts X(D) to time area signal x(t) and sends out this to transmission path 204. The present specification generally expresses a frequency area signal in an alphabetic uppercase letter with a suffix (D) and a time area signal in an alphabetic lowercase letter with a suffix (t).

Here, suppose discrete time impulse response of transmission path 204 is h(t) and a mixed noise signal is n(t). Then, signal y(t) received by the receiver is expressed in Expression (1).

$$y(t)=x(t)*h(t)+n(t) \tag{1}$$

where, "*" denotes a convolutional calculation.

In training circuit 205 on the receiver side, the adaptive equalizer asymptotically updates the value of target impulse response $B_W(D)$ using a frequency area vector of an impulse response that can be equalized to a fixed impulse response length of v taps or less as a target. For this purpose, PRBS generator 206 generates a PRBS signal in synchronization with the transmitter side, encoder 207 converts the PRBS signal to signal X(D) and target impulse response updating section 208 calculates update target impulse response $B_u$ (D).

Target impulse response updating section 208 subjects reception signal y(t) to FFT (fast Fourier transform), obtains frequency area reception signal Y(D) and calculates target impulse response $B_U(D)$ indicating a difference between the reception signal after passing the adaptive equalizer and the signal to be received originally according to expression (2).

$$B_U(D)=Y(D) \times W_W(D)/X(D) \tag{2}$$

where, $W_W(D)$ is a tap coefficient of an FIR type filter.

Target impulse response time window section 209 applies IFFT processing to target impulse response $B_U(D)$ and converts this to a time area signal, extracts tap coefficient $b_W(t)$ through a time window of a fixed length of v taps, applies FFT processing to tap coefficient $b_W(t)$ and converts this to frequency area target impulse response signal $B_W(D)$ of a fixed length of v taps.

Tap coefficient updating section 210 calculates an error from Expression (3) using X(D), $B_W(D)$, Y(D) and $W_W(D)$ and obtains tap coefficient $W_U(D)$ corresponding to a minimum of error E(D) using an LMS method (least-square method).

$$E(D)=X(D) \times B_W(D)-Y(D) \times W_W(D) \tag{3}$$

$W_U(D)$ is updated as:

$$W_U(D)=W_W(D)+2\mu \times E(D) \times X^*(D) \tag{4}$$

where, $\mu$ denotes a step size of LMS and X* denotes a complex conjugate of X.

Tap coefficient time window section 211 extracts the updated $W_U(D)$ by a length corresponding to the number of taps calculated when the actual signal is received as the value of $W_W(D)$.

In the training of the adaptive equalizer above, the transmitter and receiver generate PRBS repeatedly in synchronization with each other, training circuit 205 repeats the above procedure until error E(D) converges on a threshold or below and tap coefficient $W_W(D)$ finally obtained is used as the tap coefficient of the adaptive equalizer. This can equalize the impulse response to a sufficiently short length even on a poor transmission path and eliminate interference between symbols and interference between channels.

However, in the adaptive equalizer above, target impulse response updating section 208 performs FFT processing once, target impulse response time window section 209 performs IFFT processing once, tap coefficient updating section 210 performs FFT processing twice and tap coefficient time window section 211 performs IFFT processing once, and these calculations are repeated for every symbol. Thus, the adaptive equalizer above has a problem that the amount of calculation becomes enormous, and since calculations are made by reciprocating between the time area and frequency area, the adaptive equalizer above also has a problem that the filter factor includes errors, which reduces reliability.

SUMMARY OF THE INVENTION

It is an object of the present invention to provide an adaptive equalizer training circuit, modem apparatus and a communication apparatus using this adaptive equalizer training circuit capable of drastically reducing the amount of calculation during a training period and stably converging a tap coefficient without allowing calculation errors to get mixed by performing error calculations in the training process and updating of the tap coefficient in a time area.

The present invention directly calculates training in a time area bypassing FFT and thereby adaptively equalizes channel distortion of the transmission path using FIR filter w(t) and FIR filter b(t).

A first aspect of the present invention is a training circuit to train a tap coefficient of an adaptive equalizer and is a training circuit for an adaptive equalizer that performs error calculations in the training process and updating of the tap coefficient in a time area.

Such an adaptive equalizer training circuit can directly perform error calculations and updating of the tap coefficient in the time area and can thereby adaptively equalize channel distortion of the transmission path using FIR filter w(t) and FIR filter b(t) bypassing FFT, and can thereby drastically reduce the amount of calculation during a training period and stably converge the tap coefficient without allowing calculation errors to get mixed.

A second aspect of the present invention is an adaptive equalizer training circuit that comprises a signal generation section that generates the same training signal as that on the transmitter side, a correction section that corrects a time difference between a training signal received in the initial stage of training and a self-produced training signal, a target signal response updating section that calculates a target signal through a convolutional calculation of a variable tap coefficient to be updated by an error signal with the self-produced training signal and a tap coefficient updating section that carries out a convolutional calculation of the tap coefficient to be updated by the error signal with the received training signal, calculates a difference between the convolutional calculation result and the target signal in the time area and generates the error signal, and repeats training until the tap coefficient of the tap coefficient updating section reaches a convergence condition.

According to such an adaptive equalizer training circuit, the target signal response updating section and tap coefficient updating section update the tap coefficient in the time area and the tap coefficient updating section even carries out an error calculation in the time area, and therefore it is possible to drastically reduce the amount of calculation during a training period and stably converge the tap coefficient without allowing calculation errors to get mixed.

A third aspect of the present invention is the adaptive equalizer training circuit with the second aspect further equipped with an initial impulse response calculation section that calculates impulse response of a training signal received through the transmission path, an initial impulse response time window section that detects a maximum power area of the calculated impulse response and detects a time difference between the training signal received based on the detection position and self-produced training signal and a time-axis shift section that shifts the time-axis of the received training signal based on the detected time difference.

In this way, an error calculation is performed after shifting the time-axis of the training signal received thereafter based on the maximum power area of the first calculated impulse response and adjusting the shifted time-axis to the beginning of the self-produced training signal, which requires only a first one calculation of impulse response, thus making it possible to drastically reduce the amount of calculation of impulse response in the training process.

A fourth aspect of the present invention is the adaptive equalizer training circuit of the third aspect in which the signal waveform of the maximum power area of the impulse response calculated by the initial impulse response calculation section is given as an initial value of the tap coefficient in the target signal response updating means.

Since the signal waveform of the maximum power area of the impulse response is given as an initial value of the tap coefficient in this way, the target signal fluctuates less, the tap coefficient generally converges more quickly and the amount of errors after convergence is also reduced.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the adaptive equalizer of the present invention will be explained in detail below.

(Embodiment 1)

Figure 15:
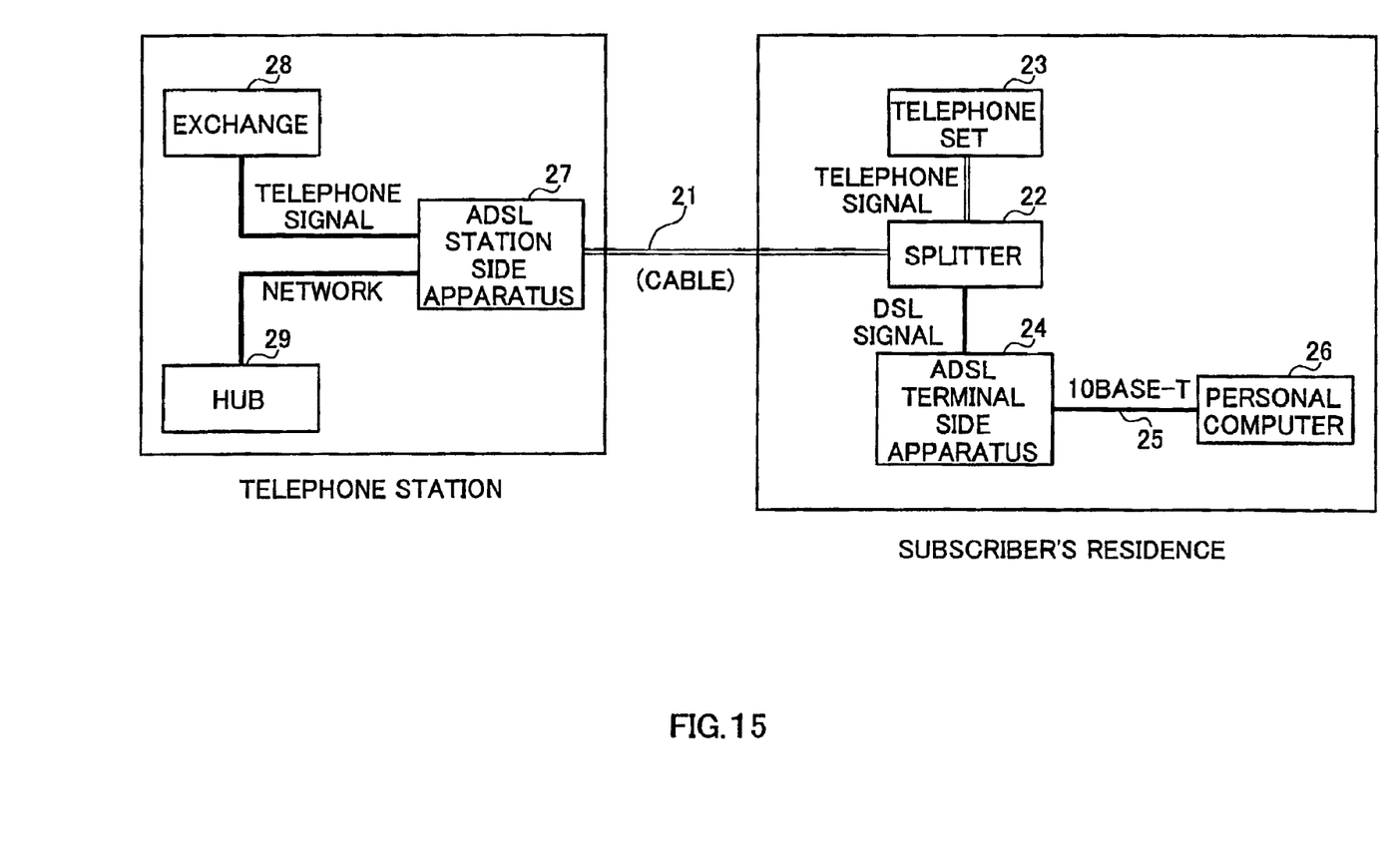
FIG. 15 shows an example of a connection mode of a communication system to which the adaptive equalizer training circuit according to Embodiment 1, 2 or 3 is applied.

Before explaining a modem apparatus equipped with an adaptive equalizer training circuit according to the present invention, an example of channel connection mode, which will be constructed via this modem apparatus will be briefly explained with reference to FIG. 15.

A telephone station, which serves as a station to accommodate a carrier is connected with a subscriber's residence, which is a user residence, via copper cable 21. At the subscriber's residence, telephone set 23 is connected with ADSL terminal side apparatus 24 via splitter 22.

Furthermore, a personal computer 26 is connected to ADSL terminal side apparatus 24 via local network 25 such as 10BASE-T as a communication terminal apparatus. At the telephone station, exchange 28 and hub (or router) 29 are connected via ADSL station side apparatus 27.

When communication terminal apparatus 26 carries out data communication, a training signal compliant with an ADSL system standard is sent between ADSL terminal side apparatus 24 and ADSL station side apparatus 27 at the telephone station. This embodiment will be explained assuming that this modem apparatus is mounted on ADSL terminal side apparatus 24 at the subscriber's residence, but the modem apparatus can also be mounted on ADSL station side apparatus 27. Furthermore, splitter 22 can also be incorporated in ADSL terminal side apparatus 24 and if the ADSL system standard is G.Lite, no splitter is required.

Figure 2:
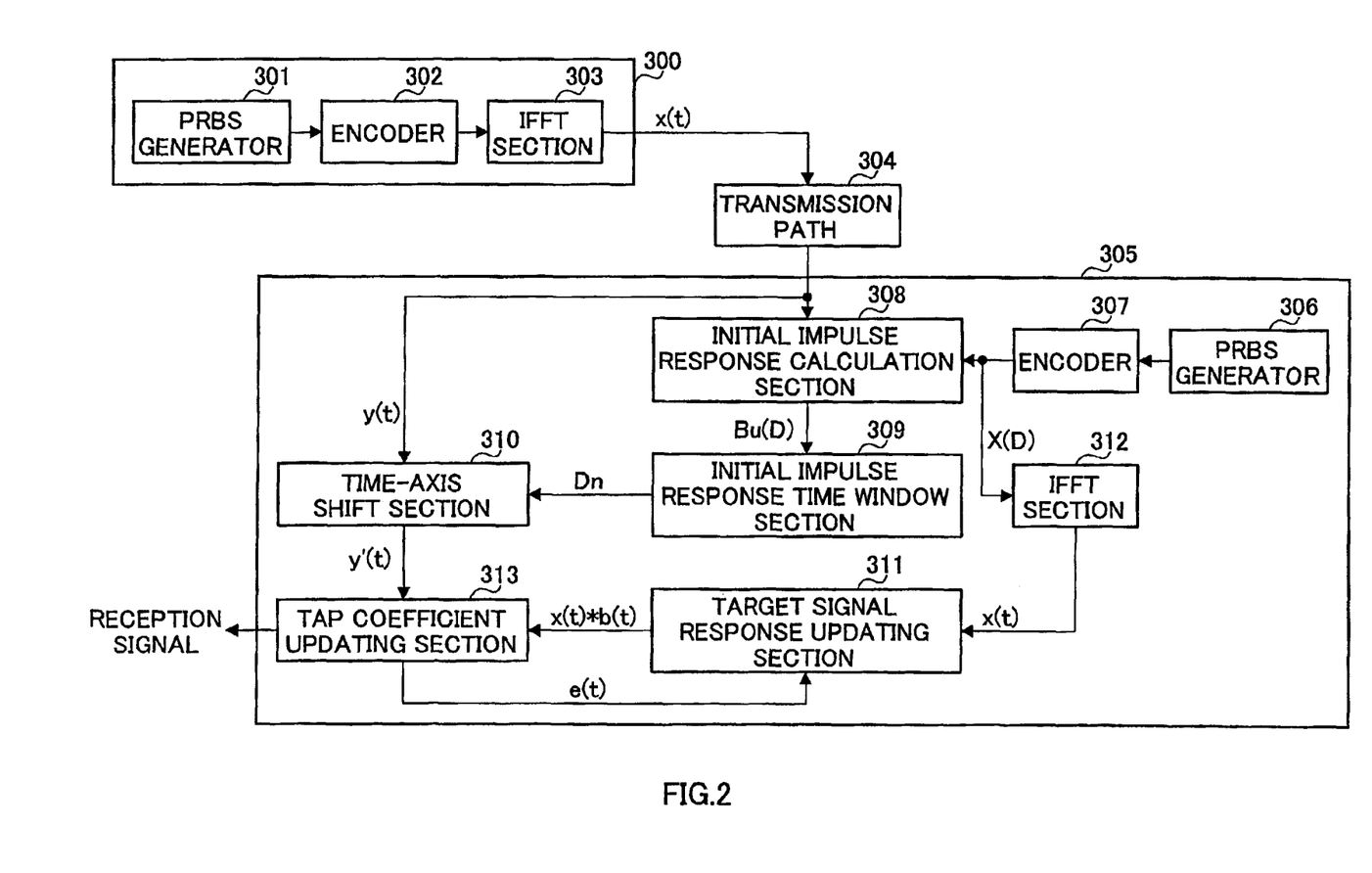
FIG. 2 is a block diagram of an adaptive equalizer training circuit according to Embodiment 1 of the present invention.

FIG. 2 is an overall view of a communication system composed of transmitter 300 and receiver 305, which trains a tap coefficient of an adaptive equalizer of a modem apparatus mounted on receiver 305 in correspondence with the transmission characteristic of transmission path 304 connecting transmitter 300 and receiver 305. Receiver 305 is incorporated in the ADSL terminal side apparatus in FIG. 15 and the adaptive equalizer according to the present invention is applied thereto.

A PRBS signal is used for training of the adaptive equalizer. Therefore, transmitter 300 encodes the PRBS signal generated by PRBS generator 301 through encoder 302 and generates frequency area signal X(D). IFFT section 303 sends out signal X(D) to transmission path 304 as time area signal x(t). At this time, suppose discrete time impulse response of transmission path 304 is h(t) and mixed noise signal is n(t). Then, signal y(t) received by receiver 305 is expressed as:

$$y(t)=x(t)*h(t)+n(t)$$

On the other hand, receiver 305 also generates signal X(D) through PRBS generator 306 and encoder 307 in synchronization with the transmitter and calculates initial impulse response $B_U(D)$ by inputting signal X(D) to initial impulse response calculation section 308.

Figure 3:
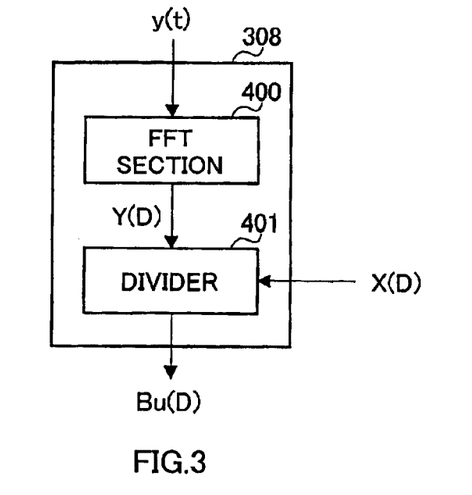
FIG. 3 is a block diagram showing an internal configuration of the initial impulse response calculation section shown in FIG. 2.

Initial impulse response calculation section 308 is configured by a functional block shown in FIG. 3 and FFT section 400 subjects reception signal y(t) to FTT to transform reception signal y(t) to frequency area signal Y(D) and divider 401 calculates initial impulse response $B_U(D)$.

$$B_U(D)=Y(D) \times W_W(D)/X(D)$$

The processing so far is almost identical to that of the conventional example described above, but while the conventional example needs to calculate and update target impulse response $B_U(D)$ for every symbol, in this embodiment, once an impulse response is obtained at the beginning, calculation of further impulse response will not be required in subsequent symbols.

Impulse response $B_U(D)$ obtained by initial impulse response calculation section 308 is sent to initial impulse response time window section 309. On the receiver side, the sampling starting position of y(t) is unknown before training is started, and therefore sampling is repeated by a predetermined number of samples from a random sampling starting position. Initial impulse response calculation section 308 finds an initial impulse response and initial impulse response time window section 309 detects an amount of shift Dn up to the position of the maximum amplitude of the impulse response and the receiver corrects the sampling starting position by an amount of shift Dn and then starts sampling.

Figure 8:
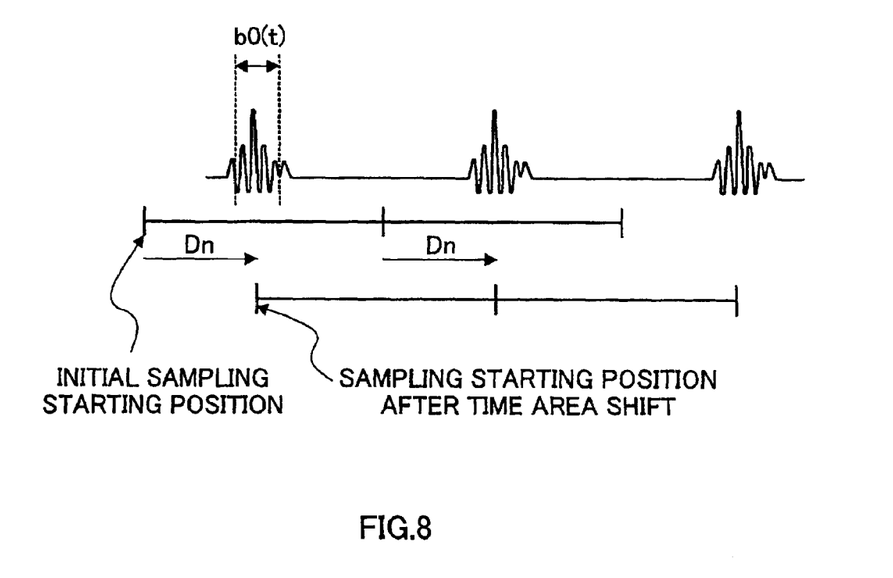
FIG. 8 is a drawing showing a shift operation of the sampling starting position of the time-axis shift section shown in FIG. 2.

FIG. 8 shows a relationship between the initial sampling starting position and impulse response position. Initial impulse response time window section 309 executes processing of shifting the sampling starting position up to the position of the maximum amplitude of impulse response and processing of calculating initial value b0(t) of target impulse response. By the way, initial value b0(t) is not used in this embodiment.

Figure 4:
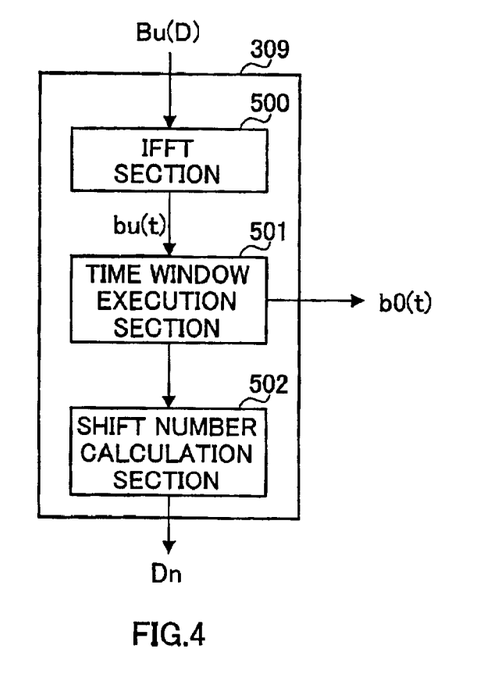
FIG. 4 is a block diagram showing an internal configuration of the initial impulse response time window section shown in FIG. 2.

FIG. 4 is a functional block diagram of initial impulse response time window section 309. In initial impulse response time window section 309, IFFT section 500 converts impulse response Bu(D) to time area signal bu(t). Then, time window execution section 501 extracts the maximum amplitude section of bu(t) by a length of certain taps and outputs the extracted maximum amplitude section as initial value b0(t) of target impulse response.

Furthermore, in initial impulse response time window section 309, shift number calculation section 502 calculates the distance from the initial sampling starting position to the position of the maximum amplitude of impulse response as shift Dn. This embodiment executes an adaptive equalizer training error in a time area, and therefore unlike the conventional example, it is necessary to correct the sampling starting position before starting the training. However, when the shift of the sampling starting position is smaller than the number of taps of w(t) and b(t), the shift can be absorbed by the tap coefficient. Therefore, once the sampling starting position is corrected, there will be no further need to calculate impulse response repeatedly.

Figure 5:
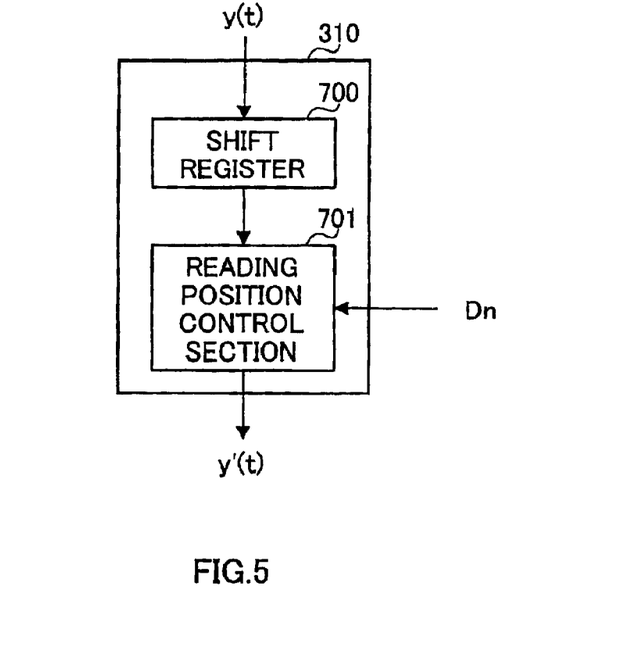
FIG. 5 is a block diagram showing an internal configuration of the time-axis shift section shown in FIG. 2.

Time-axis shift section 310 is configured by the functional block shown in FIG. 5 and sequentially stores input signal y(t) in shift register 700 and reading position control section 701 shifts the position of reading from shift register 700 by the amount of shift Dn calculated above and thereby adjusts the sampling starting position of reception signal y(t) to the beginning of x(t).

On the other hand, signal X(D) received by the receiver is also input to target signal response updating section 311 via IFFT section 312 simultaneously. Target signal response updating section 311 carries out a convolutional calculation of the PRBS signal converted to time area signal x(t) by IFFT section 312 with tap coefficient b(t).

Figure 6:
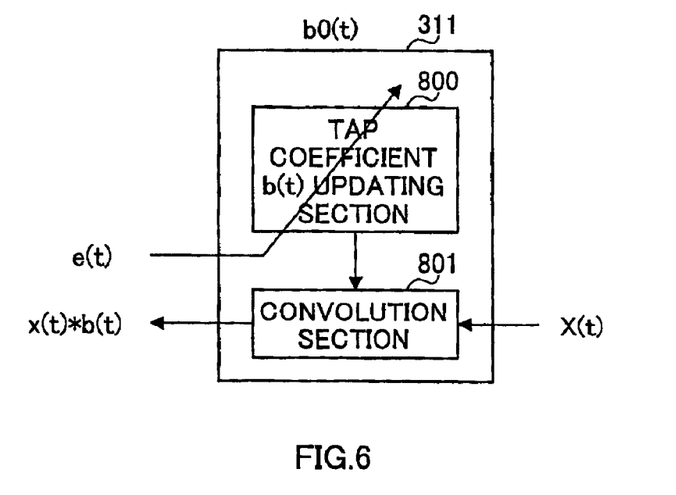
FIG. 6 is a block diagram showing an internal configuration of the target signal response updating section shown in FIG. 2.

FIG. 6 is a functional block diagram of target signal response updating section 311. Tap coefficient b(t) updating section 800 recursively updates according to time area error amount e(t) obtained by tap coefficient updating section 313. In the calculation at the time of updating, tap coefficient b(t) is updated according to Expression (5).

$$bn(t)=bn-1(t)+\mu 1 \cdot e(t) \cdot x(t) \qquad (5)$$

where, $\mu 1$ denotes the step size when b(t) is updated.

Figure 7:
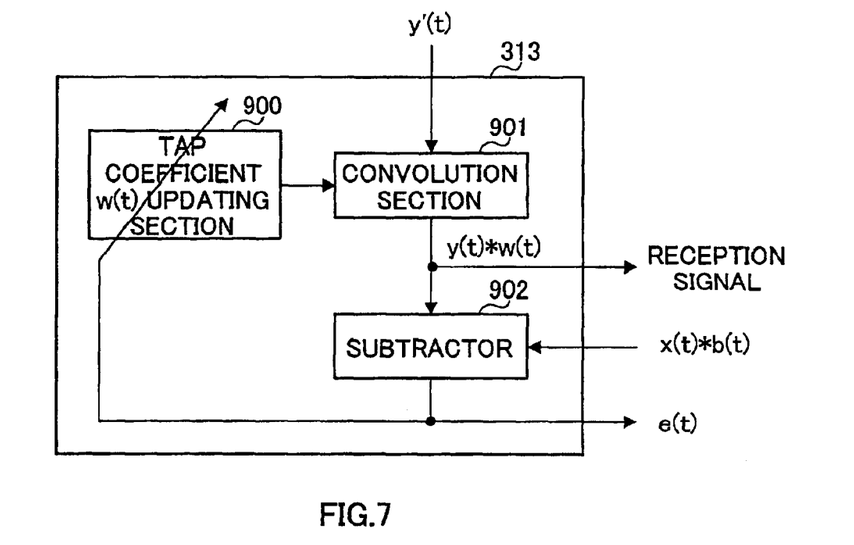
FIG. 7 is a block diagram showing an internal configuration of the tap coefficient updating section shown in FIG. 2.

FIG. 7 is a functional block diagram of tap coefficient updating section 313. In tap coefficient updating section 313, convolution section 901 carries out a convolutional calculation of reception signal y(t) with tap coefficient w(t). Subtractor 902 calculates a difference between convolutional calculation result [y(t)*w(t)] and target signal [x(t)*b(t)] sent from target signal response updating section 311 for every sample and feeds back the calculation result to target signal response updating section 311 and tap coefficient w(t) updating section 900 as error amount e(t). Then, subtractor 902 calculates e(t) for every sample, feeds back e(t) to tap coefficient w(t) updating section 900 and tap coefficient b(t) updating section 800, recursively updates w(t) and b(t) and thereby converges adaptive equalizer tap coefficient w(t). The calculation when w(t) is updated is expressed in Expression (6).

$$wn(t)=wn-1(t)+\mu 2 \cdot e(t) \cdot y(t) \qquad (6)$$

where, $\mu 2$ denotes the step size when w(t) is updated.

The adaptive equalizer training circuit in FIG. 1 above finds the portion where the impulse response on the transmission path is longer than a guard band signal in an ADSL-based communication as frequency area error E(D), asymptotically and recursively updates target impulse response values and tap coefficient values of the adaptive equalizer alternately with reference to reception signal Y(D) and frequency area training vector X(D) and calculates a convergence value of the tap coefficient by repeating this procedure. On the other hand, this embodiment does not use a direct technique that regards only an impulse response outside the guard band section as an error, but the filtering of the x(t) signal by the tap coefficient of b(t) simulates the impulse response of the guard band signal section, making it possible to train the tap coefficient that reduces interference between symbols as a result of training.

Figure 9:
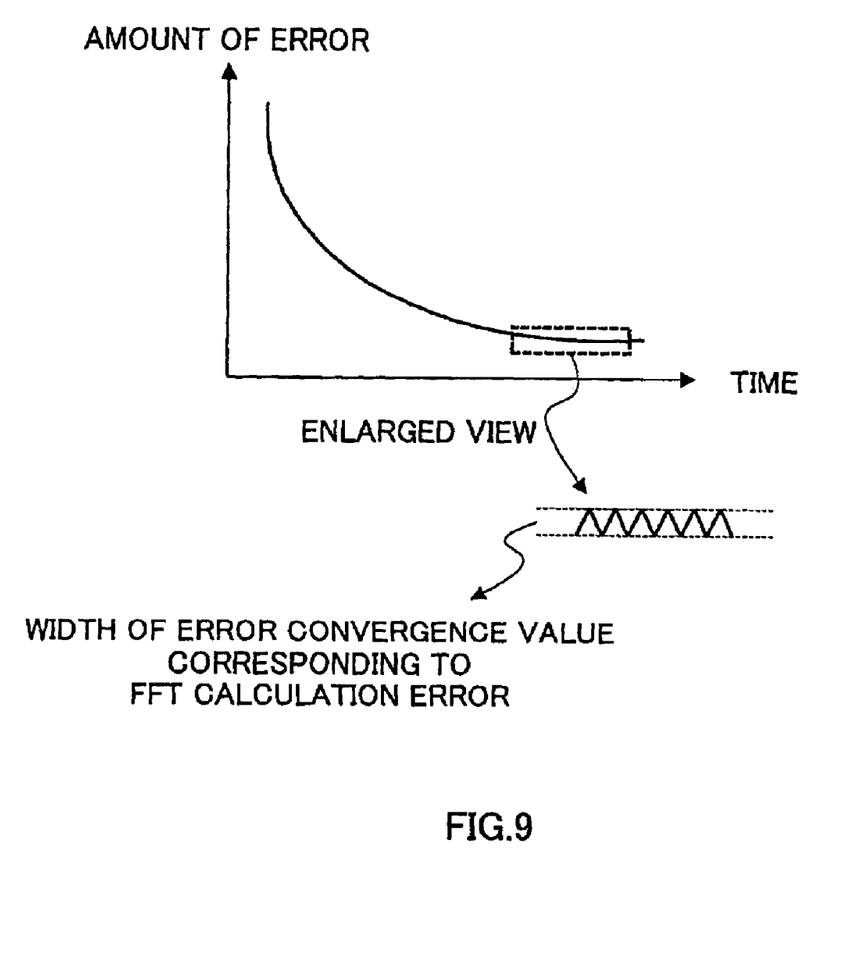
FIG. 9 is a graph showing an error convergence error in the conventional example.

This embodiment performs error calculations in the training process and updating of tap coefficient in the time area, and thereby eliminates the need for periodic calculations of FFT/IFFT and can thereby drastically reduce the amount of training calculation. Furthermore, training while performing conversion in the time area and frequency area as in the case of the conventional example fails to prevent a conversion error shown in FIG. 9 from persisting to the end due to an FFT calculation accuracy error, whereas this embodiment carries forward convergence with only time area calculations and can thereby obtain stable convergence of the tap coefficient.

(Embodiment 2)

In order to allow tap coefficient b(t) of the adaptive equalizer to converge normally, this embodiment inputs initial value b0(t) of the target impulse response obtained by the initial impulse response time window section to the target signal response updating section as an initial value of tap coefficient b(t).

Figure 10:
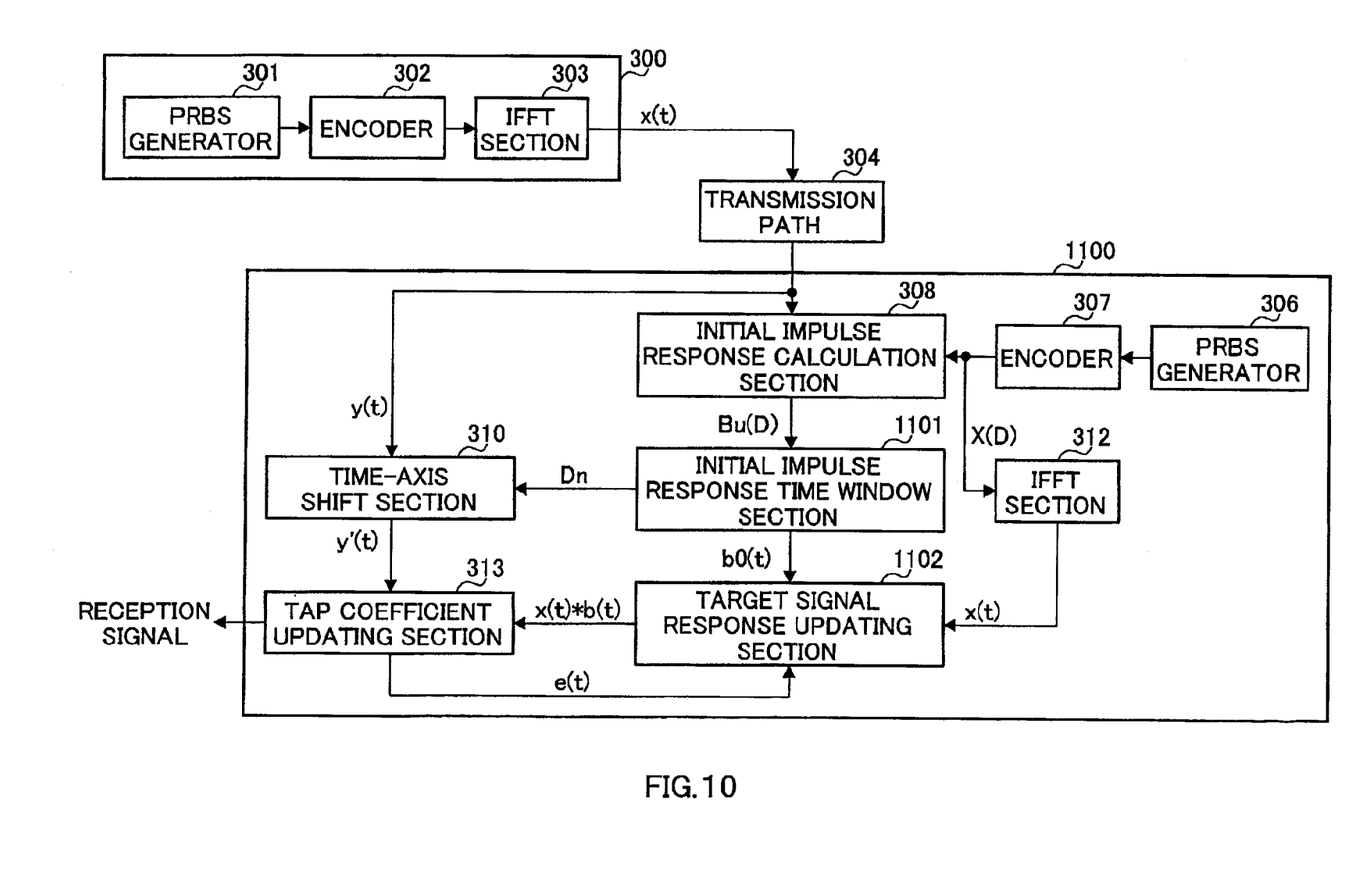
FIG. 10 is a block diagram of a training circuit of an adaptive equalizer according to Embodiment 2 of the present invention.

FIG. 10 is an overall diagram of a communication system that trains a tap coefficient of an adaptive equalizer mounted on receiver 1100. The parts having the same functions as those in Embodiment 1 above are assigned the same reference numerals.

Figure 11:
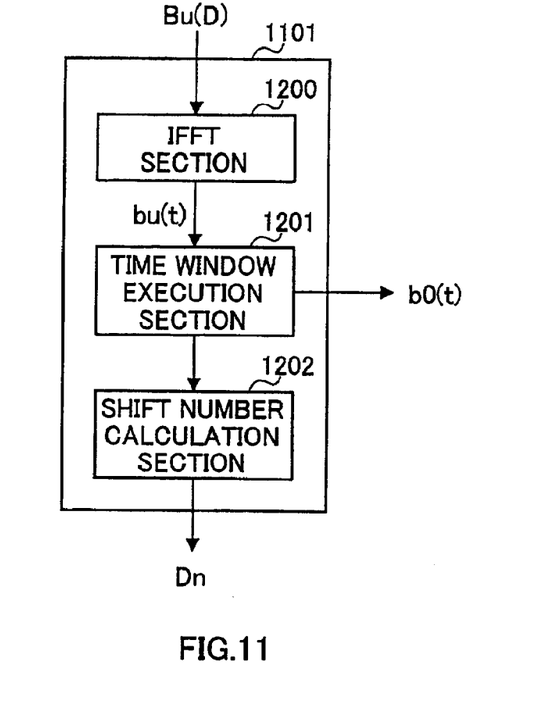
FIG. 11 is a block diagram showing an internal configuration of the initial impulse response time window section shown in FIG. 10.
Figure 12:
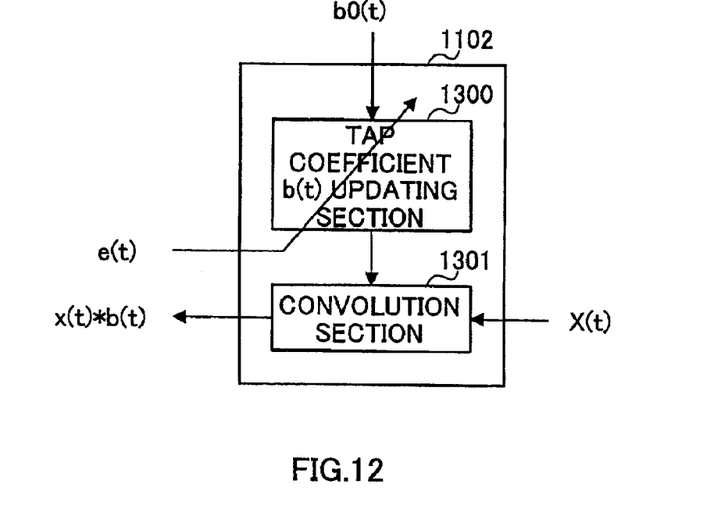
FIG. 12 is a block diagram showing an internal configuration of the target signal response updating section shown in FIG. 10.

In receiver 1100, initial value b0(t) of the target impulse response obtained by initial impulse response time window section 1101 is input to target signal response updating section 1102 as an initial value of tap coefficient b(t). The rest of the configuration is the same as that of the embodiment above. FIG. 11 shows a block diagram of initial impulse response time window section 1101 and FIG. 12 shows a block diagram of target signal response updating section 1102. Initial value b0(t) calculated by time window execution section 1201 of initial impulse response time window section 1101 is given to tap coefficient b(t) updating section 1300 of target signal response updating section 1102 as an initial value.

Here, the conventional example normalizes coefficients of $B_W(D)$ or $W_W(D)$ to prevent these coefficients from converging on 0. In the present invention, when the initial value of b(t) is set, for example, to [0 . . . 1 0 1 . . . 0], the tap coefficient of b(t) plays the role of a low pass filter and the high frequency component of the target impulse response reduces, and therefore the tap coefficient fails to converge normally. In the case where b(t) and w(t) are set in such a way that "1" is set as the center tap as [0 . . . 0 1 0 . . . ], the tap coefficient converges but the coefficient does not converge well if no attention is paid to the values of step sizes $\mu 1$ and $\mu 2$ when b(t) and w(t) are updated. This is because when b(t) and w(t) are updated simultaneously and the two tap coefficients approach a mutual target value asymptotically.

In order to avoid such a problem, this embodiment gives b0(t) obtained by initial impulse response time window section 1101 as an initial value of tap coefficient b(t). It is confirmed through a simulation that the convergence value of tap coefficient b(t) when such an initial value b0(t) is given is similar to the waveform of the maximum power amplitude of impulse response. Therefore, giving b0(t) obtained by initial impulse response time window section 1101 as an initial value of b(t) and setting step size $\mu 1$ when b(t) is updated to a value smaller than step size $\mu 2$ when w(t) is updated will reduce variations of the target signal, quicken the convergence of the tap coefficient and reduce the amount of errors after the convergence.

(Embodiment 3)

This embodiment carries out averaging of reception signal y(t) and carries out training of the tap coefficient based on the averaging result, and thereby suppresses mixing of noise signals.

As described in Embodiment 1 above, signal y(t) received by the receiver contains mixed noise signal n(t). When the noise signal is mixed in, convergence of the tap coefficient starts to fluctuate. Moreover, when the noise level exceeds a certain degree, the tap coefficient may not converge either. Thus, this embodiment carries out averaging of reception signal y(t) to suppress mixing of noise signals.

Figure 13:
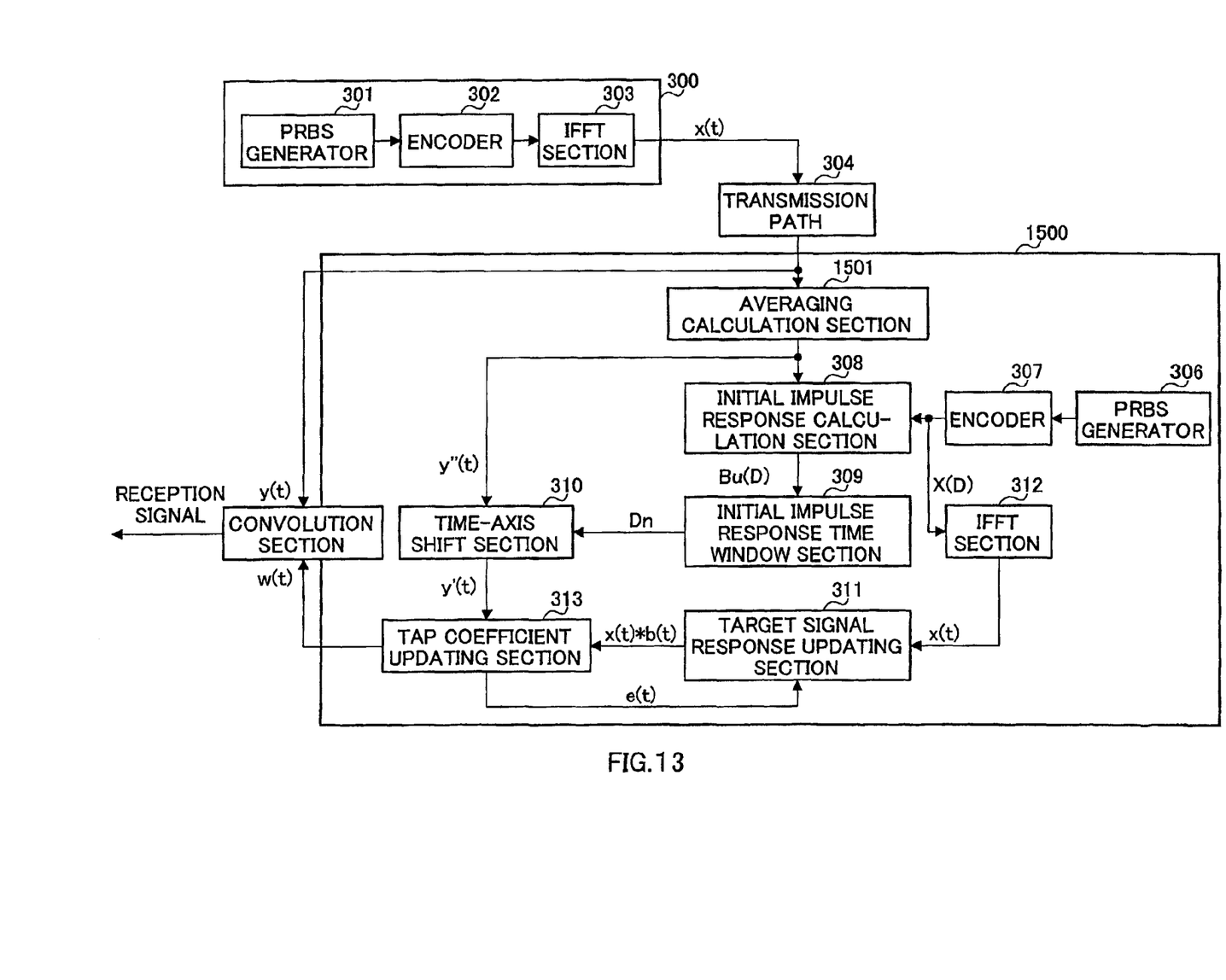
FIG. 13 is a block diagram of a training circuit of an adaptive equalizer according to Embodiment 3 of the present invention.

FIG. 13 is an overall diagram of a communication system that trains the tap coefficient of an adaptive equalizer mounted on receiver 1500. The parts having the same functions as those in Embodiment 1 above are assigned the same reference numerals. In this embodiment, receiver 1500 does not directly give reception signal y(t) to the training circuit, but inputs reception signal y(t) to averaging calculation section 1501 and carries out averaging of symbol signals.

Figure 14:
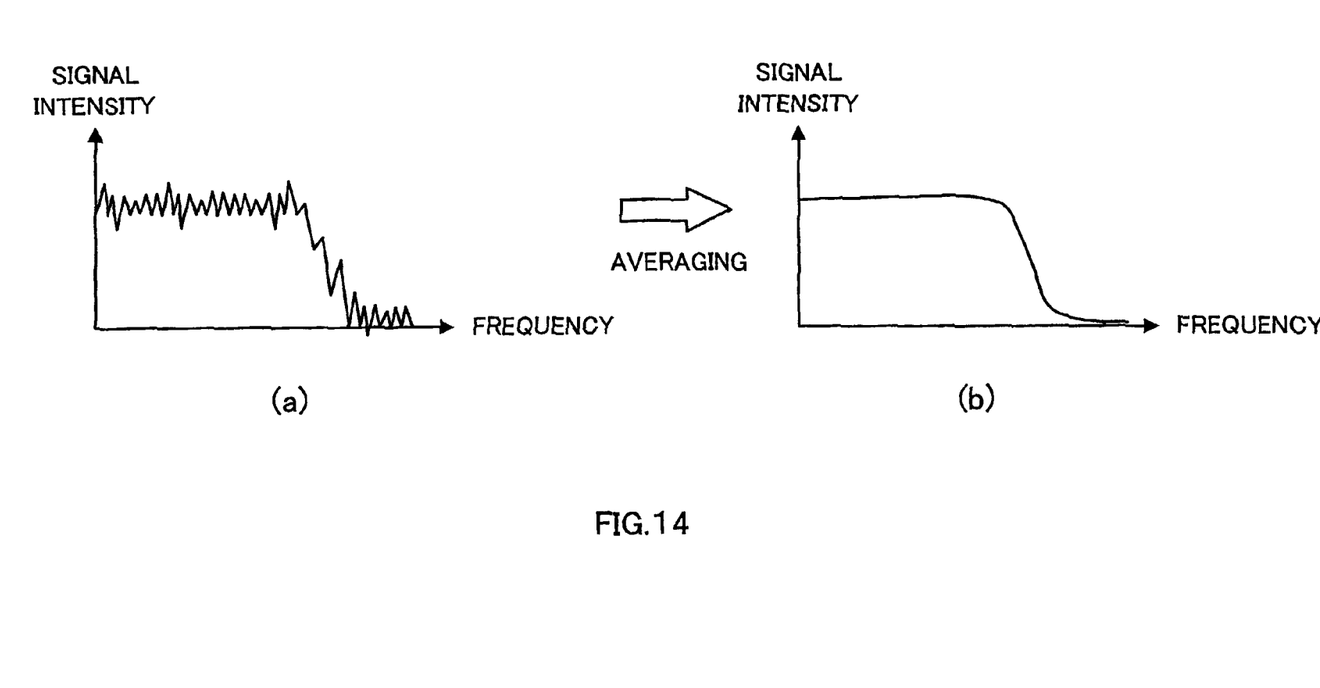
FIG. 14 is a graph showing a reduction of mixed noise by averaging.

Here, noise mixing signal n(t) is generally a random signal on the time scale, while the PRBS signal used for training in the ADSL system is a signal repeated for every symbol. For this reason, by carrying out averaging of symbol signals, it possible to suppress influences of noise signals and extract only the PRBS signal. This is shown in FIG. 14A and FIG. 14B.

Inputting the signal with the influences of noise signals suppressed by averaging calculation section 1501 to initial impulse response calculation section 308 and carrying out training of the tap coefficient allows stable training without being affected by noise signals.

In receiver 1500 shown in Embodiment 3 above, it is also possible to input b0(t) calculated by initial impulse response time window section 309 to target signal response updating section 311 as an initial value of tap coefficient b(t).

The present invention is not limited to the above described embodiments, and various variations and modifications may be possible without departing from the scope of the present invention.

This application is based on the Japanese Patent Application No.2000-153771 filed on May 24, 2000, entire content of which is expressly incorporated by reference herein.

What is claimed is:

1. An adaptive equalizer training circuit that performs a training process, the adaptive equalizer training circuit being connected to a transmitter via a transmission path and receiving a training signal from the transmitter, the adaptive equalizer training circuit comprising:

a training signal generator configured to generate the same training signal as the training signal received from the transmitter;

an initial impulse response calculator configured to correct a time difference between the training signal received from the transmitter in a training starting stage and the training signal generated by the training signal generator;

a target signal response updater configured to calculate a target signal by carrying out a convolutional calculation, the convolutional calculation being carried out, based on a tap coefficient updated by an error signal and the training signal generated by the training signal generator, the convolutional calculation being carried out in a time domain;

a tap coefficient updater comprising:
  a convolutional calculator configured to carry out a convolutional calculation, based on the tap coefficient updated by the error signal and the training signal received from the transmitter, the convolutional calculation being carried out in the time domain;
  a subtractor configured to calculate a difference between the convolutional calculation result obtained by the target signal response updater and the convolutional calculation result obtained by the convolutional calculator, the difference being calculated in the time domain; and
  an error signal generator configured to generate the error signal, based on the difference calculated by the subtractor, the error signal being utilized by the target signal response updater and the convolutional calculator;

wherein the adaptive equalizer training circuit repeats the training process until the tap coefficient, updated by the tap coefficient updater, reaches a predetermined convergence condition.

2. The adaptive equalizer training circuit according to claim 1, wherein the initial impulse response calculator is further configured to:
  calculate an impulse response of the training signal received form the transmitter via the transmission path;
  detect a maximum power area of the calculated impulse response;
  detect a time difference between the training signal received from the transmitter in the detected maximum power area and the training signal generated by the training signal generator; and
  shift a time-axis of the training signal received from the transmitter, based on the detected amount of the time difference.

3. The adaptive equalizer training circuit according to claim 2, wherein a signal wave form of the maximum power area of the calculated impulse response is input to the target signal response updater as an initial value of the tap coefficient.

4. The adaptive equalizer training circuit according to claim 1, further comprising an averaging calculator configured to average the training signals received from the transmitter via the transmission path, wherein the tap coefficient updater utilizes the averaged training signal as the training signal received from the transmitter for updating the tap coefficient.

5. A modem apparatus, transmitting and receiving a signal according to a frequency multiplexing system, the frequency multiplexing system utilizing a plurality of frequencies, the modem apparatus comprising:
  an adaptive equalizer training circuit configured to perform a training process, to be connected to a transmitter via a transmission path and to receive a training signal from the transmitter, the adaptive equalizer training circuit, comprising:
    a training signal generator configured to generate the same training signal as the training signal received from the transmitter;
    an initial impulse response calculator configured to correct a time difference between the training signal received from the transmitter in a training starting stage and the training signal generated by the training signal generator;
    a target signal response updater configured to calculate a target signal by carrying out a convolutional calculation, the convolutional calculation being carried out, based on a tap coefficient updated by an error signal and the training signal generated by the training signal generator, the convolutional calculation being carried out in a time domain;
    a tap coefficient updater comprising:
      a convolutional calculator configured to carry out a convolutional calculation, based on the tap coefficient updated by the error signal and the training signal received from the transmitter by the signal generator, the convolutional calculation being carried out in the time domain;
      a subtractor configured to calculate a difference between the convolutional calculation result obtained by the target signal response updater the and the convolutional calculation result obtained by the convolutional calculator, the difference being calculated in the time domain; and
      an error generator configured to generate the error signal, based on the difference calculated by the subtractor, the error signal being utilized by the target signal response updater and the convolutional calculator;
    wherein the active equalizer training circuit repeats the training process until the tap coefficient, updated by the tap coefficient updater, reaches a predetermined convergence condition.

6. An ADSL terminal apparatus equipped with a modem apparatus according to claim 5.

7. An ADSL station apparatus equipped with a modem apparatus according to claim 5.

8. A communication apparatus equipped with a modem apparatus according to claim 5.

9. An adaptive equalizer training method for performing a training process, in which a training signal is received from a transmitter via a transmission path, the adaptive equalizer training method comprising:
  generating the same training signal as the training signal generated by the transmitter;
  correcting a time difference between the training signal received from the transmitter in a training starting stage and the generated training signal;
  calculating a target signal by carrying out a first convolutional calculation, the convolutional calculation being carried out, based on a tap coefficient updated by an error signal and the generated training signal, the convolutional calculation being carried out in a time domain;
  carrying out a second convolutional calculation, based on a the tap coefficient updated by the error signal and the training signal received from the transmitter, the convolutional calculation being carried out in the time domain;
  calculating a difference between a result of the first convolutional calculation and a result of the second convolutional calculation, the difference being calculated in the time domain;

generating the error signal, based on the calculated difference, the error signal being utilized for carrying out the first convolutional calculation and the second convolutional calculation; and repeating the training process until the updated tap coefficient reaches a predetermined convergence condition.

10. The adaptive equalizer training method according to claim 9, wherein the correcting further comprises:

calculating an impulse response of the training signal received from the transmitter via the transmission path;

detecting a maximum power area of the calculated impulse response;

detecting a time difference between the training signal received from the transmitter in the detected maximum power area and the generated training signal; and shifting a time-axis of the training signal received from the transmitter, based on the detected amount of the time difference.

11. The adaptive equalizer training method according to claim 10, wherein a signal wave form of the maximum power area of the calculated impulse response is utilized, as an initial value of the tap coefficient, for carrying out a second convolutional calculation.

12. The adaptive equalizer training method according to claim 9, further comprising:

averaging the training signals received from the transmitter via the transmission path, the averaged training signal being utilized as the training signal received from the transmitter for updating the tap coefficient.

* * * * *